United States Patent [19]

Lombard et al.

[11] Patent Number: 4,682,104
[45] Date of Patent: Jul. 21, 1987

[54] ANGULAR DISPLACEMENT PICKUP, PARTICULARLY FOR THE DETECTION OF TORQUE IN POWER STEERING

[75] Inventors: Claude Lombard, Le Chesnay; Jean-Paul Brisset, Thiais; Gérard Catier, Issy les Moulineaux; Jean-Luc Marais, Nanterre; Gino Zammarchi, Chatou, all of France

[73] Assignee: Regie Nationale des Usines Renault, Boulogne-Billancourt, France

[21] Appl. No.: 635,494

[22] Filed: Jul. 30, 1984

[30] Foreign Application Priority Data

Jul. 29, 1983 [FR] France .................. 83 12511

[51] Int. Cl.$^4$ .......................... G01B 7/14; G01B 7/24
[52] U.S. Cl. ................................. 324/208; 324/209; 324/226; 180/142; 340/870.32
[58] Field of Search .................. 324/207–209, 324/202, 260, 261, 262, 239, 242, 228; 180/141, 142, 143; 340/870.32; 336/120–123, 129; 318/660; 333/140; 73/779, 811, 847, 862.08, 862.69

[56] References Cited

U.S. PATENT DOCUMENTS

| 2,621,514 | 12/1952 | Waugh | 324/208 X |
|---|---|---|---|
| 2,671,892 | 3/1954 | Childs | 336/123 X |
| 2,756,385 | 7/1956 | Matthews | 324/208 X |
| 2,782,515 | 2/1957 | Mayes | 324/207 X |
| 2,867,783 | 1/1959 | Childs | 336/123 |
| 2,900,612 | 8/1959 | Tripp | 336/200 X |
| 2,921,280 | 1/1960 | Litwin et al. | 336/123 X |
| 3,090,933 | 5/1963 | Henry-Baudot | 336/120 |
| 3,121,851 | 2/1964 | Packard | 336/120 X |
| 3,281,746 | 10/1966 | Buntschuh | 336/123 |
| 3,382,472 | 5/1968 | Maass | 336/123 X |
| 3,431,525 | 3/1969 | Buntschuh et al. | 336/123 |
| 3,441,888 | 4/1969 | Farrand | 336/123 |
| 3,517,271 | 6/1970 | Edmonds et al. | 336/120 X |
| 3,611,813 | 10/1971 | Brocker | 336/123 X |
| 3,758,845 | 9/1973 | MacKelvie et al. | 336/120 X |
| 4,032,906 | 6/1977 | Jackson, Jr. | 324/227 X |
| 4,106,334 | 8/1978 | Studtmann | 324/209 X |
| 4,223,300 | 9/1980 | Wiklund | 340/870.32 X |

FOREIGN PATENT DOCUMENTS

| 1427243 | 1/1965 | France | 324/208 |
| 2381284 | 9/1978 | France | 324/208 |
| 40659 | 3/1977 | Japan | 324/208 |
| 2065897 | 7/1981 | United Kingdom | 324/208 |

Primary Examiner—Gerard R. Strecker
Assistant Examiner—Warren S. Edmonds
Attorney, Agent, or Firm—Oblon, Fisher, Spivak, McClelland & Maier

[57] ABSTRACT

The contactless angular displacement and/or torque pickup is characterized in that it comprises two electrically insulating coaxial disks (7a, 7b) that can turn in relation to one another by an angle to be detected and that carry on their opposing faces conductive plane coils (8) in the shape of spirally wound sectors coiled alternately in both directions and whose mutual induction varies as a function of the relative angular position of the detection disks (7a, 7b). Also included is a rotary transformer (6a, 6b) to supply one of the detection disks (7a, 7b), a circuit (18) for supplying the primary (11a) of the rotary transformer and a circuit (17, 18) for processing the signal (S) collected on one of the detection disks (7a, 7b).

14 Claims, 16 Drawing Figures

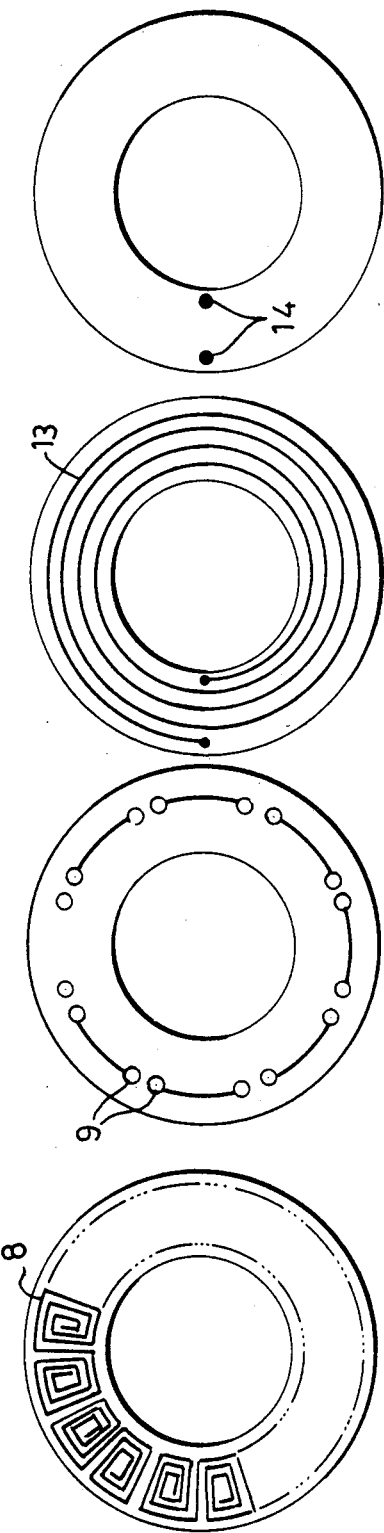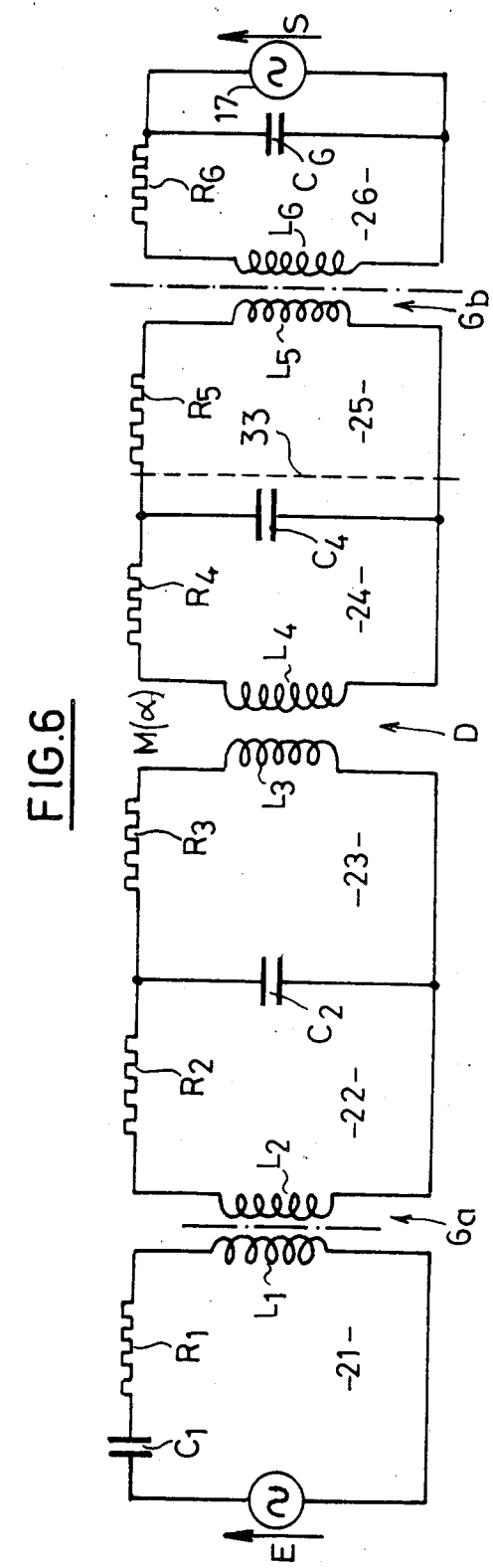

ANGULAR DISPLACEMENT PICKUP, PARTICULARLY FOR THE DETECTION OF TORQUE IN POWER STEERING

BACKGROUND OF THE INVENTION

1. Field of the Invention

This invention relates to an improved angular displacement pickup applicable particularly to the detection of the torque exerted by the driver on the steering wheel of a motor vehicle provided with power steering.

2. Description of the Prior Art

Torque detection, on currently manufactured vehicles, is obtained by inserting a torque shaft between the steering wheel and the steering shaft, which makes possible the disengagement of orifices in a rotary hydraulic valve. The variations obtained at the output of the valve drive a jack connected to the steering drag link.

This technique has proven very reliable and relatively satisfactory, but the assistance provided by this type of steering is too high when the vehicle travels at an appreciable speed. There are entirely hydraulic devices which make it possible to correct this fault, but these correction devices further increase again the price of the product.

A solution to this problem consists in resorting to pickups that make it possible to measure relatively accurately the torque exerted by the driver on the steering wheel and to modulate the assistance provided as a function of the torque measured and the speed of the vehicle. The assistance can be provided either by hydraulic means, or by electric means.

Patent application FR-A-2 472 174 describes a unit for measuring, without contact, an angle of rotation and/or a torque on a rotating or stationary shaft. This unit comprises two identical coaxial induction disks provided with notches in the shape of sectors and that can turn in relation to one another. Associated with these two disks is one, or preferably, two coils also in the shape of disks and through which a high frequency alternating current travels. The coil or coils induce into the disks eddy currents whose intensity is a function of their relative angular position, currents which themselves influence the inductance of the coil or coils. By using this inductance variation by known means, there is obtained an image of the relative angular position of the two disks. This unit can thus be applied to the measurement of torque, particularly for power steering, by making one of the disks solid with the steering wheel and the other with the torque shaft placed between the steering wheel and the steering shaft.

This unit exhibits, however, the drawback of not making possible the recognition of the direction of the angular deviation measured and of not possessing true physical zero.

The present invention provides an angular displacement pickup particularly suited to the detection of torque on revolving parts, particularly the torque exerted by a driver on the steering column of a motor vehicle, and which makes it possible to avoid the drawbacks of the unit described in patent application FR 2 472 174.

SUMMARY OF THE INVENTION

Accordingly, one object of the invention is to provide a novel pickup for contactless angular displacement and/or torque, characterized in that it includes two coaxial disks which can be turned in relation to one another by an angle to be detected and which carry on their opposing faces, plane coils in the shape of spirally wound sectors coiled alternately in both directions and whose mutual induction varies as a function of the relative angular position of the detection disks, therefor is a rotary transformer to supply one of the detection disks, a supply circuit for the primary of the rotary transformer and a processing circuit for processing the signal collected on one of the detection disks.

A more complete appreciation of the invention and many of the attendant advantages thereof will be readily obtained as the same becomes better understood by reference to the following detailed description when considered on connection with the accompanying drawings, wherein:

FIG. 3A is a view of the front face of a support disk in which detection coils are represented;

FIG. 3B is a view of the rear face of the support disk in which the connection contacts of the detection coils are represented;

FIGS. 4A and 4B represent respectively a view of the front face and of the rear face of a support disk constituting a rotary transformer;

FIG. 6 is an equivalent electrical diagram of a pickup according to the invention associated with a working circuit;

DESCRIPTION OF THE PREFERRED EMBODIMENTS

Figure 1:
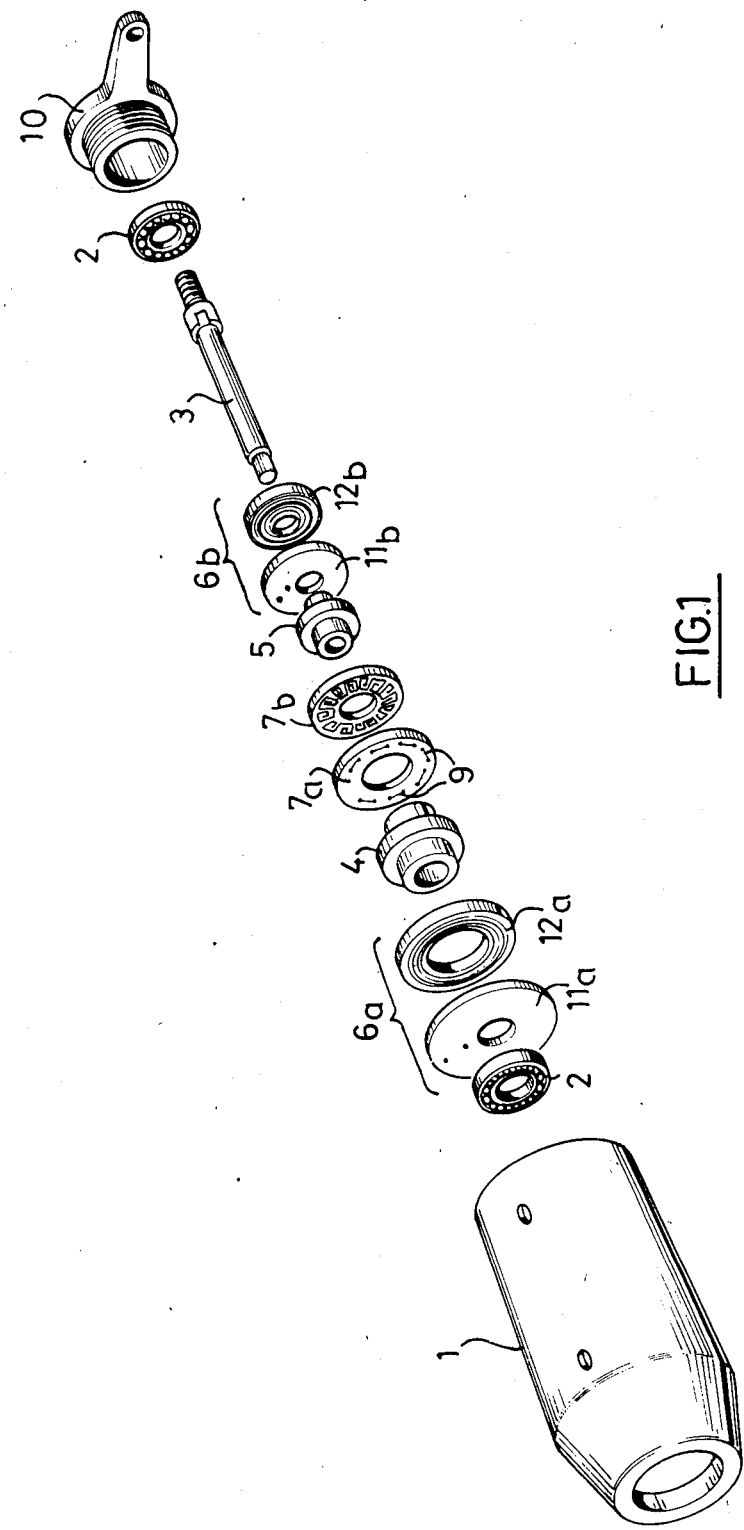
FIG. 1 is an exploded view in perspective of a pickup according to an embodiment of the invention.
Figure 2:
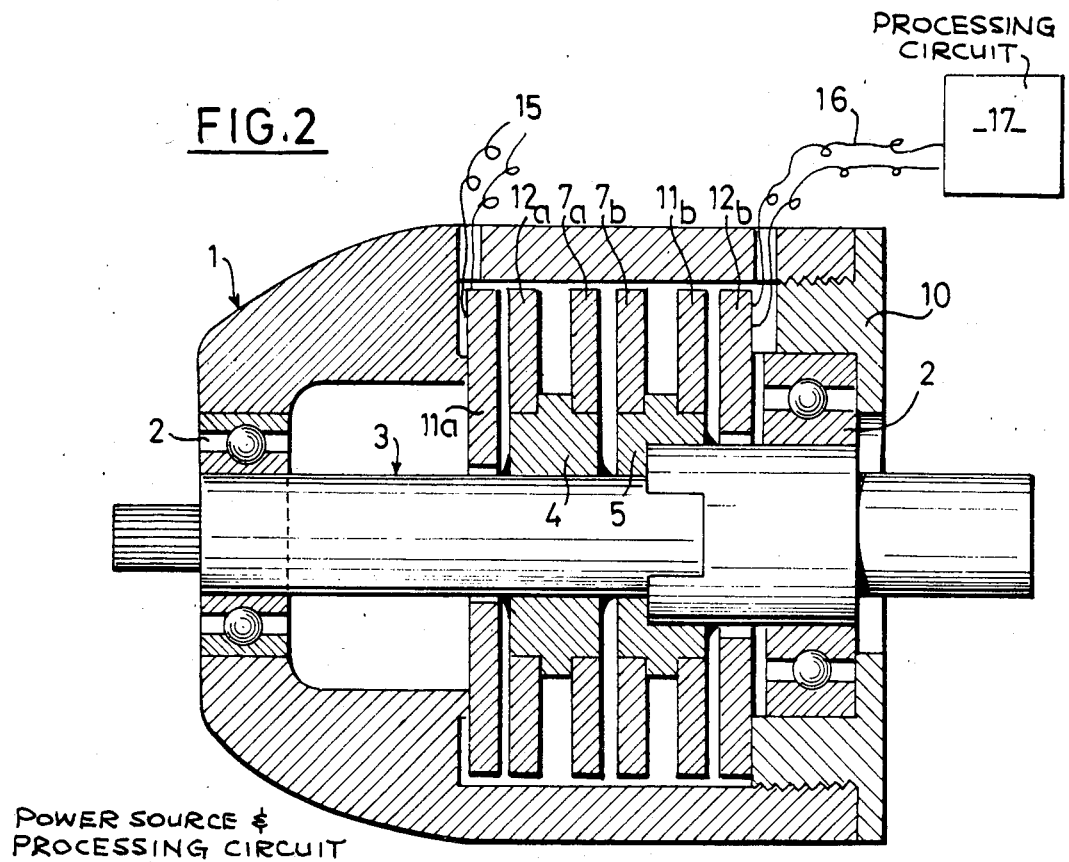
FIG. 2 is a view in longitudinal section of the pickup of FIG. 1.

Referring now to the drawings, wherein like reference numerals designate identical or corresponding parts throughout the several views, and more particularly to FIGS. 1 and 2 thereof, the pickup represented comprises a stationary protective casing consisting of two tubular parts 1 and 10 screwed to one another and mounted on a torque shaft 3 by two ball bearings 2.

Torque shaft 3 is therefore free to rotate in relation to protective casing 1, 10.

Rings 4 and 5, each solid with one of the ends of torque shaft 3, are able to turn relative to one another under the action of the torque of shaft 3.

Identical detection disks 7a and 7b exhibiting opposing plane windings 8 are fastened respectively to rings 4 and 5. Disks 7a and 7b are of an insulating material and exhibit on one of their faces windings 8 consisting of regularly distributed coils and on their other face connection contacts 9 connected electrically to the coils by holes provided in the thickness of the disks and exhibiting a metallization.

Associated respectively with coiled disks 7a and 7b are rotary transformers 6a and 6b. The first transformer 6a has two identical coiled disks 11a and 12a and, the second 6b, also two identical coiled disks 11b and 12b. Disk 11a constituting the primary of the first transformer 6a is fastened to casing 1, 10 while its secondary 12a is solid in rotation with ring 4. Similarly, disk 11b constituting the primary of the second transformer 6b is solid in rotation with ring 5 while its secondary 12b is fastened to casing 1, 10.

FIGS. 3A and 3B represent in more detail respectively the coiled faces provided with connection contacts of identical disks 7a and 7b. Coils 8, in even number, are coiled respectively one after the other in reverse direction and can take the shape of spirally wound sectors. Thus, the mutual covering surface of the spirally wound sectors coiled on disks 7a and 7b respectively is modified when these latter turn in relation to one another.

Also, FIGS. 4A and 4B show respectively the coiled faces provided with connection contacts of identical disks 11a, 12a, 11b and 12b that form the two rotary transformers. These disks are made of electrically insulating material and coupled two by two by the mutual induction due to their opposing windings 13 which exhibit the shape of a spiral or of circles concentric to the axis of rotation of the torque shaft 3. The other face of disks 11a, 12a, 11b, 12b exhibit connection contacts 14 connected electrically to windings 13 by holes provided in the thickness of the disks and exhibiting a metallization.

Disks 12a and 7a are connected electrically to one another by their connection contacts 14 and 9 and the same is true for disks 7b and 11b.

Finally, with reference again to FIG. 2, disk 11a is connected electrically to two supply conductors 15 and disk 12b by two conductors 16 having an electronic circuit 17 for processing the signal collected at secondary 12b of transformer 6b.

In operation, the stationary primary 11a of transformer 6a, to which a high frequency signal E is applied by conductors 15, produces in the winding of rotary secondary 12a an induction electromotive force which is independent of the rotation of disk 12a as a result of the symmetry of the windings of disks 11a and 12a. Also, primary disk 7a, supplied by secondary 12a of transformer 6a, produces in secondary disk 7b an induction electromotive force which, itself, increases in correspondence with the completeness with which the surfaces of the coils of secondary disk 7b cover those of the coils of primary disk 7a. This electromotive force is collected by transformer 6b on conductors 16 which apply it to electronic circuit 17. This electronic circuit, of known type, performs an appropriate processing to supply a signal representing the angular shift between disks 7a and 7b or, by an appropriate calibration, the torque exerted on torque shaft 3.

The equivalent electrical diagram of FIG. 6 makes it possible to better explain this operation. In this figure, the inductances of the various windings have been represented in the form of a pure resistance associated in series with a pure inductance. The electronic circuit supplying high frequency signal E is connected to an oscillating circuit 21 consisting of a capacitance $C_1$, a resistance $R_1$ and an inductance $L_1$ representing primary 11a of transformer 6a. This signal is transmitted by rotary transformer 6a to circuits 22, 23, 24 and 25 which are free in rotation and in which the inductances $L_2$, $L_3$, $L_4$ and $L_5$ and the associated resistances correspond to the windings of disks 12a, 7a, 7b and 11b respectively.

Detection device D, represented by inductances $L_3$ and $L_4$ (disks 7a and 7b), modulates the amplitude of the signal received as a function of the angular deviation α existing between the two disks 7a and 7b. This high frequency signal, modulated at amplitude S, is collected, via rotary transformer 6b, at the terminals of capacitance $C_6$ by an electronic circuit of known type which can be, for example, a diode synchronous demodulator or a peak detector, associated with a phase detector.

Figure 7:
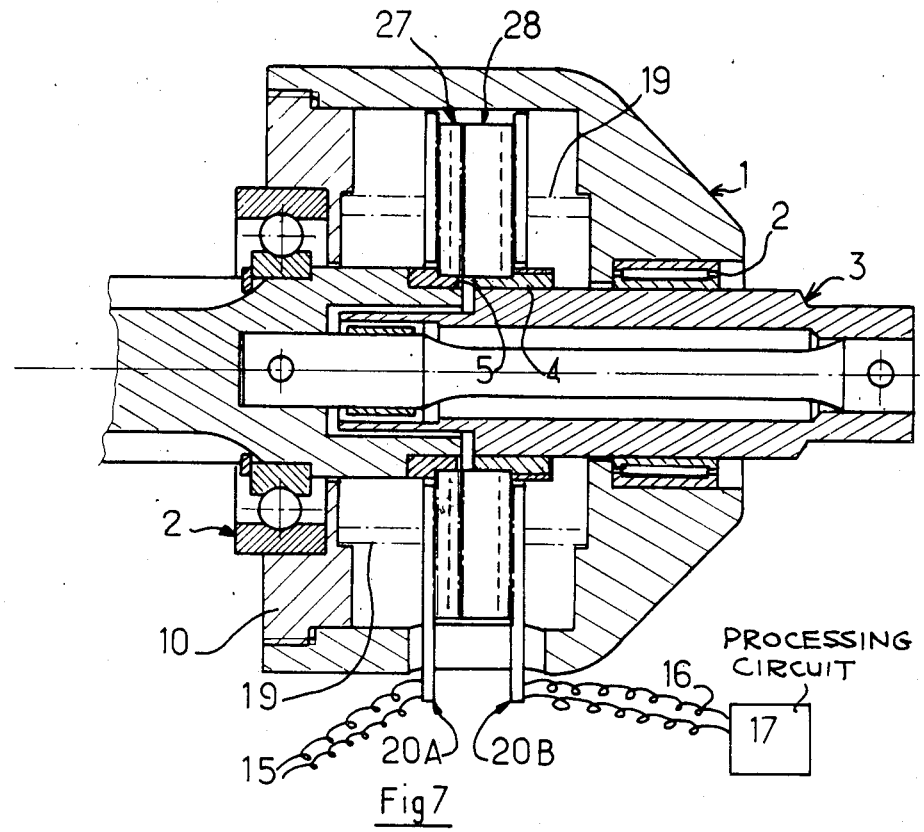
FIG. 7 is a view in longitudinal section of a variant embodiment of the pickup according to the invention, mechanically simplified in relation to FIG. 2 and more effective electrically.

The added capacitors $C_2$ and $C_4$, which must be inside the rotating disks, are not essential, particularly in the case of FIG. 7 where the distance between support disks is reduced. This reduction increases the undesirable coupling between the rotary transformers. This fault can be eliminated by the introduction of an electromagnetic screen 33 placed between circuits 24 and 25. The elimination of capacitors $C_2$ and $C_4$ simplifies the industrial design of the product.

Figure 5:
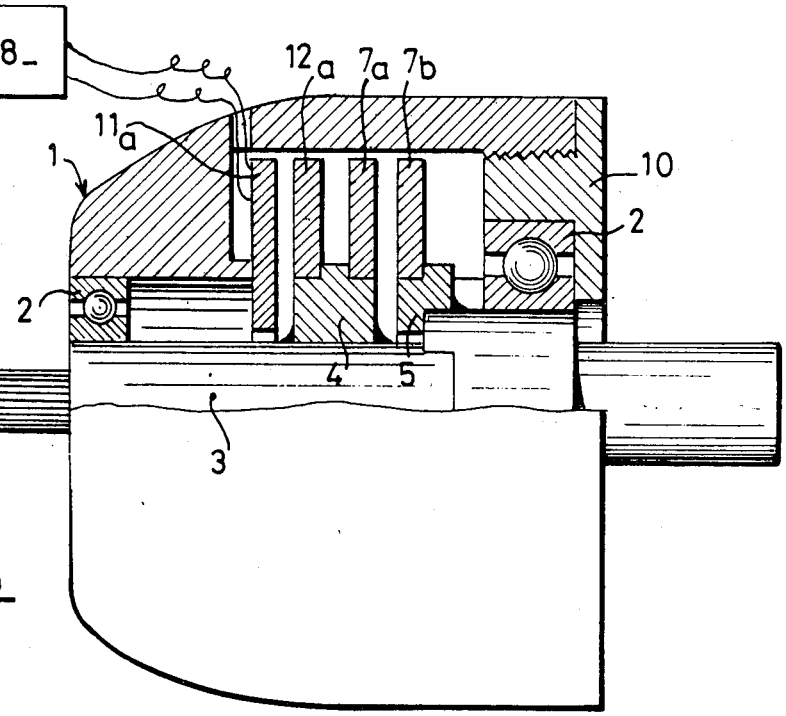
FIG. 5 is a view in longitudinal section of a variant embodiment of the pickup according to the invention.

FIG. 5 represents another embodiment which differs from that of FIG. 2 by the elimination of the second rotary transformer 6b. Primary 11a is then connected electrically to an electronic circuit 18 that makes it possible to detect the variations of mutual induction M between disks 7a and 7b or the phase variations between the current and the voltage existing in primary 11a. In FIG. 6, this elimination of transformer 6b is reflected by that of components $R_5$, $L_5$, $L_6$, $R_6$ and $C_6$.

Electronic circuit 18, providing the power supply of the device and the processing of the information collected, is of a known type and can consist of an oscillator that makes it possible to transform an impedance variation into a frequency variation around a carrier frequency fo, or else a phase detector that compares the phase variations of the current to those of the voltage taken as a reference.

FIG. 7 is another embodiment of the pickup described in FIG. 2 in which the number of parts to be mounted during the assembly has been reduced from 6 to 4 having, additionally, the advantage of reducing the scatterings of the electric output signal as a function of the mechanical tolerances of the supports. Additionally, the amplitude of the electric signal has been increased by multiplying the number of turns on the secondary of the rotary transformers which thus become voltage step-ups, by using the technique of multilayered printed circuits with metallized holes. It has been possible in this type of design to place an electromagnetic screen in receiving support disk 28.

In this figure the parts marked 1, 2, 3, 4, 5, 10, 15, 16, 17 are without notable change in relation to FIG. 2.

Figure 9A:
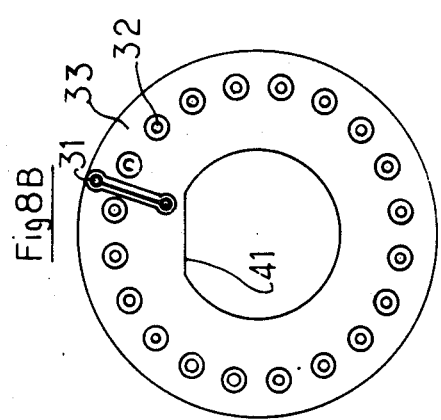
FIGS. 9A and 9B represent respectively the front and rear faces of support disks 20A and 20B of FIG. 7A, each constituting a rotary transformer.
Figure 9B:
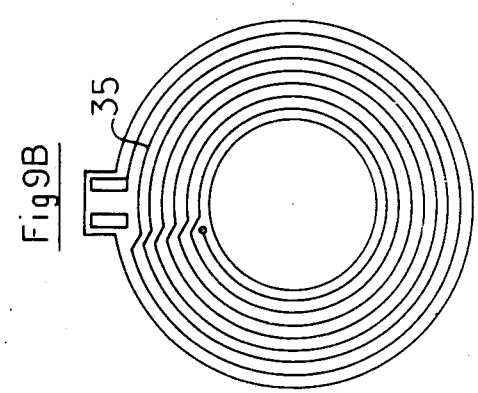

Support disk 20A constitutes the stationary part of the input rotary transformer. It carries on its outer face, connections 34 of FIG. 9A and on its inner face printed circuit 35 of FIG. 9B.

Figure 7A:
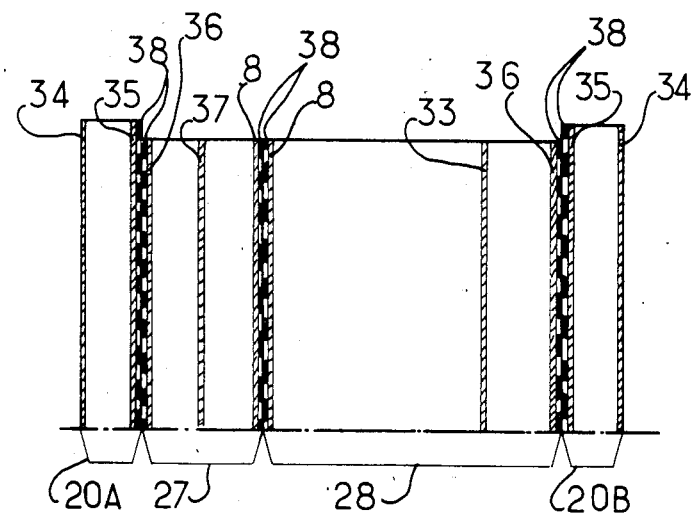
FIG. 7A is a half-view in longitudinal section of the support disks of this variant, on a larger scale.
Figure 8A:
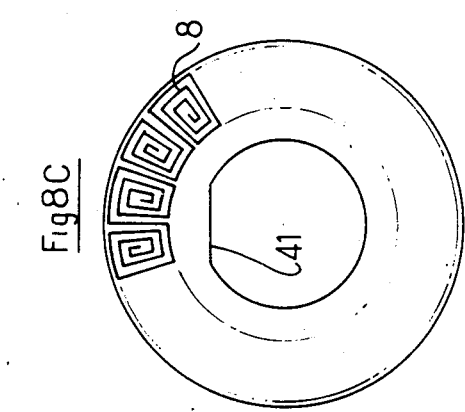
FIG. 8A represents the identical front and rear faces of support disks 27 and 28 of FIG. 7A, comprising a rotary transformer winding and connections for putting in series detection coils located on the other face of these disks.

Detecting support disk 27 solid with ring 5 carries, on its face opposite disk 20A, pattern 36 of FIG. 8A which is composed on the one hand of turns 29a constituting the first part of the secondary winding of the input rotary transformer and, on the other hand, of connections 30a for putting in series detection coils 8 (FIG. 8C) located on its other face. Support disk 27 comprises an inner layer 37 that can be seen in FIGS. 9C and 7A constituting the second part of the step-up secondary winding of the input transformer. The pattern of this winding, identical with the one of FIG. 8A, includes turns 29b in series with those referenced 29a and interconnections 30b in parallel with those referenced 30a in FIG. 8A.

Figure 8B:
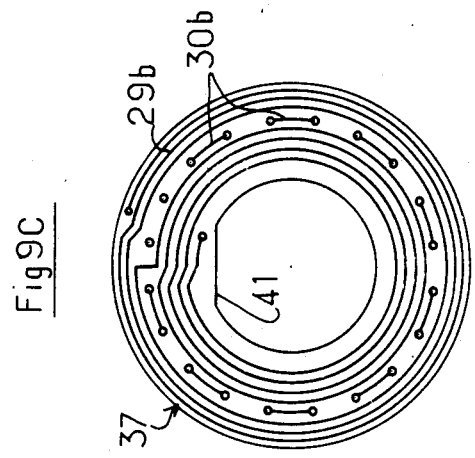
FIG. 8B represents an inner layer of the support disk 28 of FIG. 7A constituting a metal plate serving as an electromagnetic screen.
Figure 8C:
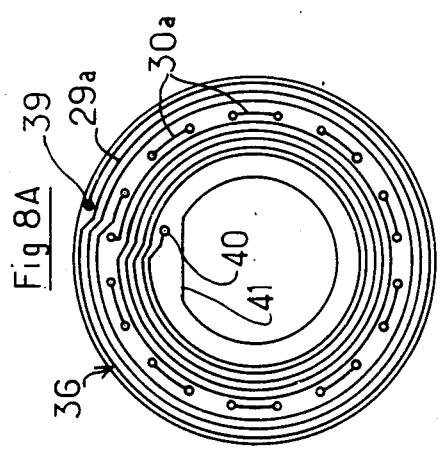
FIG. 8C represents the identical front and rear faces of support disks 27 and 28 of FIG. 7A comprising detection coils.
Figure 9C:
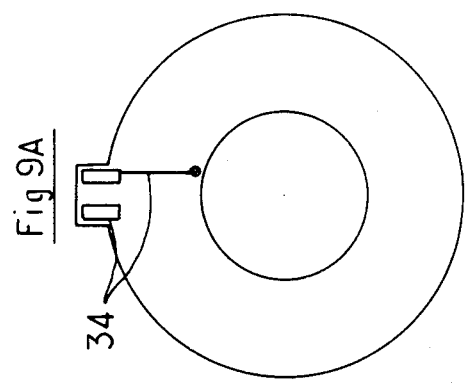
FIG. 9C represents an inner layer of support disk 27 of FIG. 7A constituting the second part of the secondary winding of a voltage step-up rotary transformer.

Support disk 28 carries, on its face opposite disk 27, detection coils 8 shown in FIG. 8C and, on its other face opposite disk 20B, pattern 36 of FIG. 8A comprising turns 29a constituting the primary of the winding of the output transformer, on the one hand, and interconnections 30a for putting into series the detection coils 8, on the other hand.

This support disk 28 includes a conductive inner layer 33 shown in FIG. 8B and 7A which acts as an electromagnetic screen reducing the direct flux between the input and output transformers (6a and 6b, FIG. 6).

This layer 33 is cut so as to allow a connection 31 to pass which assures the electrical continuity of the input 39 and the output 40 of winding 29a of winding 36 which is supplied in its middle by detection coils 8.

Support disk 20B which constitutes the stationary part of the output rotary transformer includes the same patterns 34 and 35 on its faces as stationary part 20A of the input rotary transformer.

Electrically insulating layers 38 exhibiting good mechanical friction properties (i.e., resistance to wear) are placed between support disks 20A, 27, 28, 20B as indicated in FIG. 7A. These layers, in any number can be independent or glued on the support disks. They can have a base of polytetrafluoroethylene or of a less fluorinated, similar material or else of polyethylene with a high molecular weight. It is therefore possible to have support disks 20A, 27, 28, 20B rub one another without wear and with a slight torque and therefore to avoid variable undesirable gaps between the windings mainly due to the mechanical tolerances of the parts.

Two lightly biased springs 19 located on both sides of parts 20A and 20B of the rotary transformers make it possible to keep the various parts in contact.

Support disks 27, 28 can be immobilized in rotation on rings 4 and 5 by plates 41 made in their center hole.

The pickup which has just been described can be applied to the contactless measurement of angular displacements, but it is particularly suited to the measurement of symmmetrical displacements in relation to an initial position whose electrical definition does not vary. The pickup can actually exhibit variations of sensitivity, but the reference position of zero does not vary, which is highly desirable in the case of the measurement of the torque for the power steering of a motor vehicle. Further, this pickup makes it possible to detect the direction of angular deviation because, due to the coiling alternately in both directions of coils 8, angular deviations of opposite directions are reflected by variations of the opposite signs of the signal collected.

We claim:

1. A contactless angular displacement apparatus for measurement of torque, comprising:
    two coaxial disks electrically insulated from each other and having opposing faces which disks are each rotatable in relation to one another by an angle to be detected, wherein said disks carry on said opposing faces conductive plane coils with said coils being in the shape of spirally wound sectors coiled alternately in both directions and wherein the mutual induction of said coils varies as a function of the relative angular position of said disks;
    at least one rotary transformer mounted coaxially with said disks;
    circuit means for supplying the primary of one of said at least one rotary transformer with a high frequency signal input whereby the secondary of said one rotary transformer supplies an induction electromotive force to one of said disks; and
    processing circuit means for processing signal indicating the induction electromotive force supplied by the other one of said disks.

2. An apparatus according to claim 1, wherein said at least one rotary transformer comprises a single rotary transformer and wherein said circuit means and said processing circuit means are connected to the primary of said single rotary transformer.

3. An apparatus according to claim 1, wherein said at least one rotary transformer comprises a first rotary transformer whose secondary is connected electrically to one of said coils, and a second rotary transformer whose primary and secondary connected electrically respectively to the other of said coils and to said processing circuit.

4. An apparatus according to any one of claims 1, 2 or 3, wherein each of said at least one rotary transformer consists of two identical electrically insulating disks which exhibit on their opposing faces one of circular or spiral windings concentric with the axis of said disks.

5. An apparatus according to claim 4, wherein said disks exhibit, on their faces opposite said opposing faces, connection contacts connected electrically to said windings by holes extended in the thickness of the disks and provided with metallization.

6. An apparatus according to claim 4, wherein said detection disks exhibit on one of their respective faces said detection coils in the shape of spirally wound sectors and on another of said faces said circular or spiral winding constituting a primary or a secondary of a rotary transformer.

7. An apparatus according to claim 1, wherein said coils and said transformer windings are carried by a plurality of disks which said disks rub against one another and which have electrically insulating films which exhibit good frictional properties and which said films are inserted between said disks.

8. An apparatus according to claim 7, wherein said insulating films are made up of a material having a polytetrafluoroethylene base or a similar, less fluorinated material.

9. An apparatus according to claim 8, wherein said insulating films are made up of a material having a polyethylene base with a high molecular weight.

10. An apparatus according to claim 3, further comprising at least one electromagnetic screen inserted between said rotary transformers.

11. An apparatus according to claim 10, wherein said at least one electromagnetic screen consist of an intermediate layer of one of said disk made of a multilayer print circuit.

12. An apparatus according to claim 1, wherein at least one of said at least one rotary transformer is of the voltage step-up type.

13. An apparatus according to claim 12, wherein said voltage-step up transformer comprises a secondary winding consisting of a series connection of a first winding carried by one of the faces of one of said disks and of a second winding consisting of a intermediate layer of said one of said disks made of a multilayer printed circuit.

14. An apparatus according to claim 1, wherein said disks comprise, on one of the faces of said disks exhibiting a winding constituting said rotary transformer winding, a connection means for retaining said coils in place.

* * * * *